No. 885,698. PATENTED APR. 21, 1908.
H. B. OSGOOD.
WEIGHING APPARATUS.
APPLICATION FILED DEC. 6, 1906. RENEWED AUG. 30, 1907.

Inventor
Horatio
Bonar Osgood

No. 885,698. PATENTED APR. 21, 1908.
H. B. OSGOOD.
WEIGHING APPARATUS.
APPLICATION FILED DEC. 6, 1906. RENEWED AUG. 30, 1907.

Witnesses
H. A. Robinette
E. A. Panabaker.

Inventor
Horatio Bonar Osgood
By G. Ayres
Attorney

No. 885,698. PATENTED APR. 21, 1908.
H. B. OSGOOD.
WEIGHING APPARATUS.
APPLICATION FILED DEC. 6, 1906. RENEWED AUG. 30, 1907.

Witnesses
H. A. Robinette,
E. A. Panabaker.

Inventor
Horatio Bonar Osgood

By G. Ayres
Attorney

No. 885,698. PATENTED APR. 21, 1908.
H. B. OSGOOD.
WEIGHING APPARATUS.
APPLICATION FILED DEC. 6, 1906. RENEWED AUG. 30, 1907.

Witnesses
H. A. Robinette
E. A. Canabaker

Inventor
Horatio Bonar Osgood

By G. Ayres
Attorney

UNITED STATES PATENT OFFICE.

HORATIO BONAR OSGOOD, OF BINGHAMTON, NEW YORK, ASSIGNOR TO OSGOOD SCALE COMPANY, OF BINGHAMTON, NEW YORK, A CORPORATION OF NEW YORK.

WEIGHING APPARATUS.

No. 885,698.  Specification of Letters Patent.  Patented April 21, 1908.

Application filed December 6, 1906, Serial No. 346,571. Renewed August 30, 1907. Serial No. 390,826.

*To all whom it may concern:*

Be it known that I, HORATIO BONAR OSGOOD, a citizen of the United States, residing at Binghamton, in the county of Broome and State of New York, have invented certain new and useful Improvements in Weighing Apparatus, of which the following is a specification.

My invention relates to improvements in weighing apparatus, and it consists in the constructions, combinations and arrangements herein described and claimed.

An object of my invention is to provide an improved scale, constructed to operate with a minimum of friction throughout large ranges of load and to accurately indicate the load at any point within its capacity.

A further object of my invention is to provide an improved scale by which any load within its capacity can be quickly and accurately weighed without the necessity of handling weights or of adjusting a poise upon a graduated beam.

A further object of my invention is to provide an improved scale, provided with integer and fractional gages, in which the fractional gage is adapted to indicate fractional portions of all loads within the capacity of the scale.

In the accompanying drawings, forming a part of this application and in which similar reference symbols indicate corresponding parts in the several views

Referring especially to Figs. 1—7 of the drawings, 1 indicates a vertical casing or housing, in which are located an integer gage 2, which comprises any usual form of spring scale and a fractional gage 3. A traveling link 4 has its ends connected by rods 5 and 6 to said gages for actuating the latter; the medial portion of said traveling link being pivotally connected to a connecting rod 7 leading in the usual way to any well known arrangement of weighing levers. A rack 9, pivotally connected at 8 to the rod 6, is shown slidably supported in roller guides 10 and in mesh with a pinion 11 secured on the spindle of the pointer 12 of the fractional gage.

Figure 1:
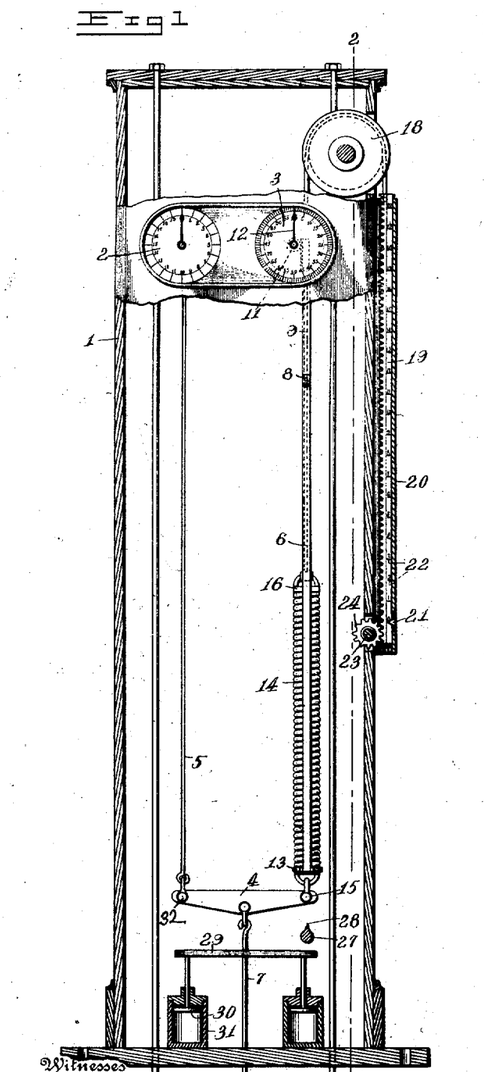
—Figure 1 is a sectional view, with the indicating gages shown in front elevation, illustrating one embodiment of my invention.
Figure 2:
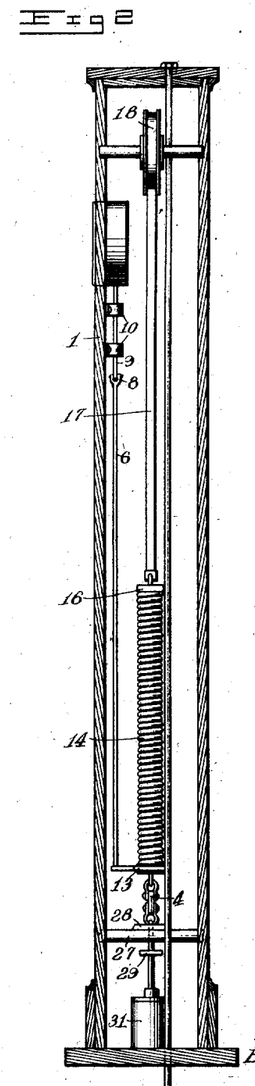
Fig. 2 is a sectional view on the line 2—2, Fig. 1.
Figure 3:
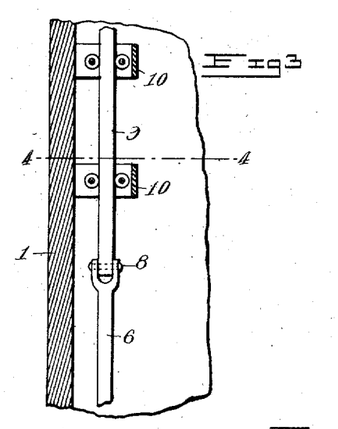
Fig. 3 is a detail sectional view, on a larger scale, clearly showing the construction of the rack-bar for actuating the fractional gage.
Figure 4:
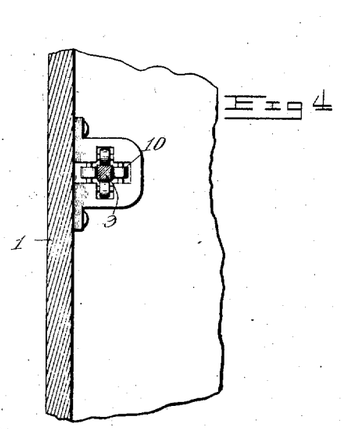
Fig. 4 is a sectional view on the line 4—4 of Fig. 3.

The connecting rod 6 is secured to the lower head 13 of a manually adjustable spring 14, said head being pivotally secured at 15 to the traveling link 4. A stop 27 secured in the casing 1, is provided with a knife edge 28 extending in the line of travel of the pivotal connection 15 of the lower spring head 13 to the traveling rod 4. The upper head 16 of the spring 14 is secured to a steel tape, or other flexible means, 17 leading over a guide pulley 18 and secured to a manually operated rack 19. The rack is slidably supported in a guide way 20 provided with a pointer 21 coöperating with index marks 22 on said rack. A shaft 23, suitably journaled in the casing 1, has secured thereto a pinion 24 in mesh with the rack 19. A notched disk 25 is secured to the shaft 23 in position for engagement by a spring-pressed latch 26 on the front face of the casing 1. I have illustrated the pinion 24 with a diameter twice that of the fractional-dial pinion 11, and the disk 25 provided with two diametrically opposite notches. The connecting rod 7 is shown provided with a cross-head 29 carrying two pistons 30 loosely fitted in cylinders 31 filled with a suitable liquid, such as glycerin and water, for deadening the action of the above described actuating means to prevent oscillation of the gage pointers.

In giving a detailed description of the operation of my invention, I will assume, for example, that the system of weighing levers employed are proportioned to transmit five pounds pull on the connecting rod 7 for each hundred pounds load on the scale platform. It is further assumed that the fractional gage 3 and its connections are so arranged that such tension of five pounds on the connecting rod 7 will draw the pivotal connection 15 on the traveling link 4 down 1¼ inches against the knife edge 28, thus converting the traveling link into a lever with the knife edge for its fulcrum; and that the integer gage 2 is so constructed that, for every pound of tension on the connecting rod 7, the pivotal points 32 on the traveling link 4 will be drawn down 1/80 of an inch and the pointer of said integer gage shifted to the extent of one division of its dial.

Figure 5:
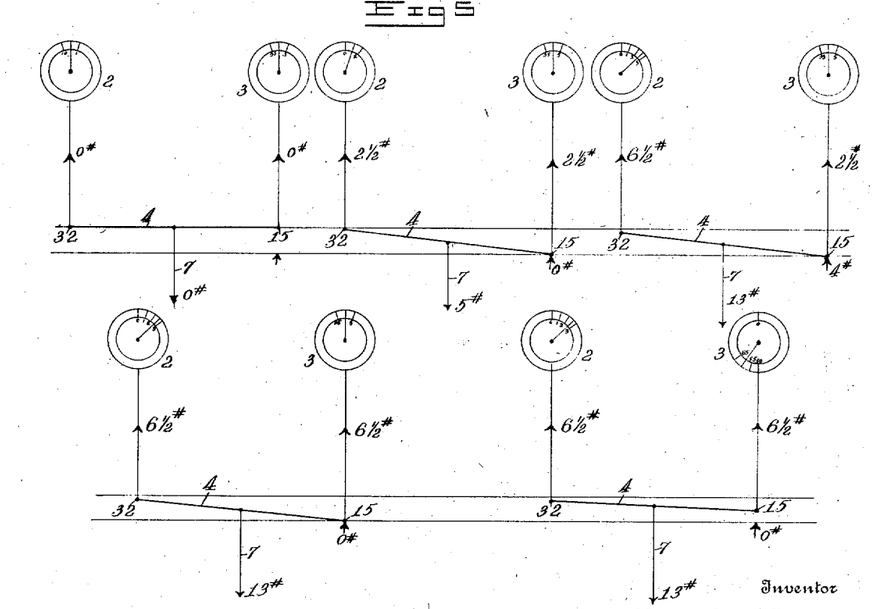
Fig. 5 is a series of diagrammatical views, illustrating the different positions of the gage pointers and their actuating means during the operation of weighing.
Figure 6:
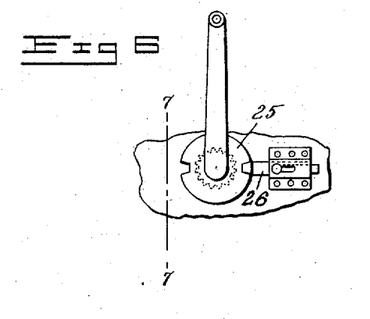
Fig. 6 is a detail elevation, illustrating one means of locking the hand-operated crank shaft shown in Fig. 1.
Figure 7:
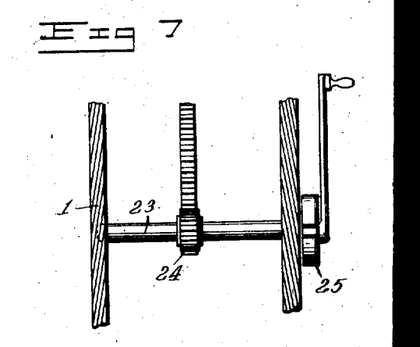
Fig. 7 is a sectional view on the line 7—7 of Fig. 6, with parts shown in elevation.

In Fig. 5, I have illustrated diagrammatically five positions successively assumed by the dial pointers of the gages, the traveling link and connections between said link and gages when weighing a load of 260 pounds. The first of these diagrammatical views illustrates the parts in their unloaded position; there being no tension on the connecting rod 7 and the pointers being at the zero marks of their dials. The second diagrammatical view illustrates the position of the parts when the scale platform has been loaded one hundred pounds. This loading has transmitted a tension of five pounds to the connecting rod 7, which tension has been distributed by the traveling link 4 equally between the connections to the two gages; the pivotal point 32 being drawn 1/16 of an inch, and the pivotal point 15 drawn down 1¼ inches until it just contacts with the knife edge 28. The pointer of the integer gage is then moved through one division, and the pointer of the fractional gage has made an entire revolution and stands again at the zero division. The third diagrammatical view illustrates the position of the parts when the load on the platform has been increased to 260 pounds. In this position of the parts, the pivotal point 15 has been pressed with a force of four pounds against the knife edge 28, and the pivotal point 32 has been swung down about the fulcrum point to a position 13/80 of an inch below its original unloaded position. During this operation, the pointer of the integer gage has been shifted to a point between the 2nd and 3rd divisions on its dial, and the pointer of the fractional gage has remained at the zero division. The operator then turns the crank shaft 23 sufficiently to bring opposite the pointer 21 the index mark on the rack 19 corresponding to the highest index mark passed by the pointer on the integer dial; in this example, to bring the index 2 on the rack 19 in registry with the pointer 21. Since the pinion has a diameter twice that of the pinion 11 secured to the fractional gage pointer, such adjustment of the rack 19 would necessitate one revolution of the crank shaft 23, thereby raising the upper cap 16 of the spring 14 through twice the extent (2½ inches) to which the spring was extended by the initial load of one-hundred pounds on the scale platform. The first two inches through which the cap 16 is raised will extend the spring 14 two inches, and thereby increase the tension of said spring four pounds, giving a total tension of 6½ pounds in the spring. The forces will then be distributed as indicated in the fourth diagrammatical figure; the pressure of the pivot 15 on the knife edge 28 being entirely relieved by the four pounds increased tension in the spring 14. The pivots 15 and 32 and the dial pointers have not been shifted at all in this operation. During the last ½ inch that the cap is raised, the tension of said spring remains constantly at 6½ pounds, and the pivot 15 is raised ½ inch from the knife edge 28. This ½ inch elevation of the pivot 15 constitutes ⅖ of the previous 1¼ inch total depression of said pivot, and causes a reverse swing of the fractional gage pointer from the zero point through ⅖ of a revolution. In the drawings, I have shown the fractional dial indexed to read in hundredths of the unit indicated by each division on the integer dial. With such divisions, the fractional pointer would be reversed through ⅖ of 100 divisions, which equals 40 divisions, and would stand at the division indicating 60/100. In such final position of the parts, the pointer of the integer gage will indicate a load corresponding to 2 and a fraction divisions on said dial, and the pointer of the fractional gage will stand indicating 60/100; thus indicating that the fractional part of the load shown by the integer gage is 60/100. The total load, as thus given by the two gages, is 2 60/100 of the weight indicated by each division on the integer dial. As an example, if such integer divisions indicated 100 pounds, the reading of the dials would give the load as 260 pounds.

The example selected for the above illustration is of course arbitrary, and it will be clear that the principle and operation described would apply for any extent of loading within the capacity of the scale and for any desired units of division on the integer and fractional dials.

Figures 12, 13:
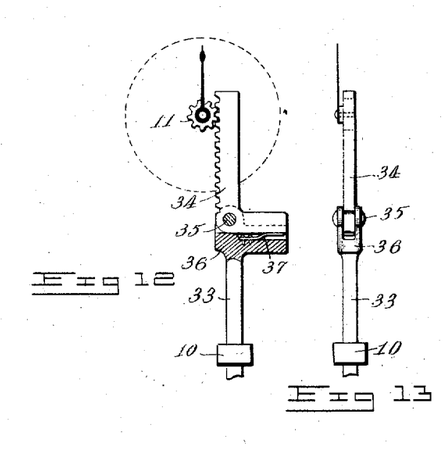
Fig. 12 is a detail elevation, partially in section, showing a preferred construction of the rack bar for actuating the fractional gage pointer.
Fig. 13 is a side elevation of the construction shown in Fig. 12.

Figs. 12 and 13 illustrate a preferred construction of the rack bar for actuating the fractional gage pointer. In this construction the rod 6 is pivotally connected to a bar 33 reciprocatingly mounted in the roller guides 10 previously described. A rack bar 34 is pivoted at 35 on a head 36 of said reciprocating bar, and a spring 37 is positioned within a recess in said head 36 for yieldingly maintaining said rack bar in mesh with the pinion 11 secured to the pointer of the fractional gage. This construction minimizes the friction and eliminates all danger of binding between the engaging parts.

Figure 8:
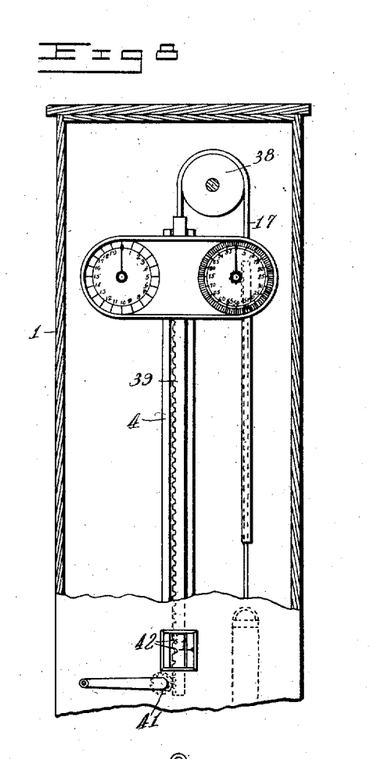
Fig. 8 is a detail sectional view, with a portion of the casing shown in front elevation, illustrating a modified construction.

Fig. 8 illustrates a slightly modified means for manually adjusting the traveling link 4 for operating the fractional gage pointer. In this modification, the steel tape 17 passes over a guide pulley 38 and is secured to the upper end of a rack bar 39 reciprocatingly mounted in guides 40 within the casing 1. The rack bar 39 is shifted by means of a pinion 41 and provided with index marks 42, all in a manner similar to that described in reference to the construction shown in Fig. 1.

Figure 9:
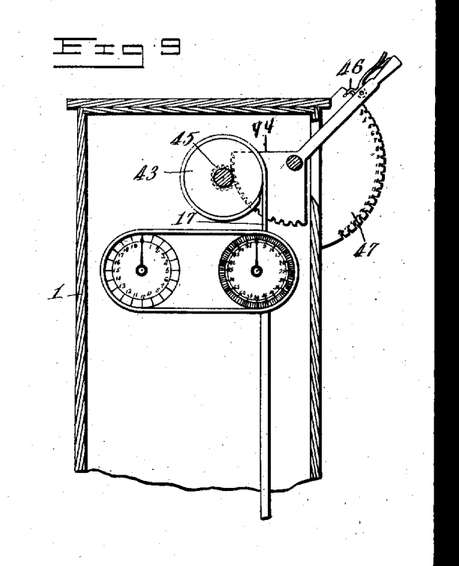
Fig. 9 is a similar view illustrating a further modification.

Fig. 9 shows a modification in which the steel tape 17 is secured to a drum 43. A toothed segment 44, is arranged in mesh with a pinion 45 secured on the drum shaft, for actuating said drum; said segment carrying a spring latch 46 coöperating with a quadrant 47 provided with suitably spaced and indexed notches for determining the extent of operation of the drum.

Figure 10:
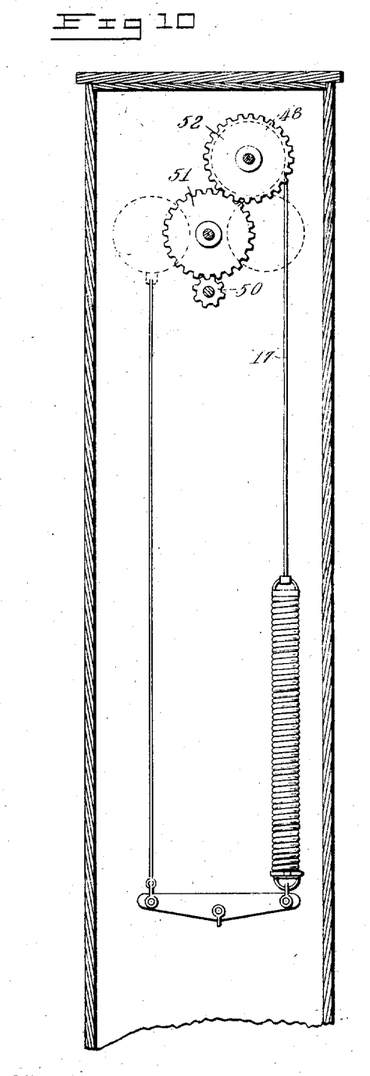
Fig. 10 is a vertical sectional view, illustrating a further modification.
Figure 11:
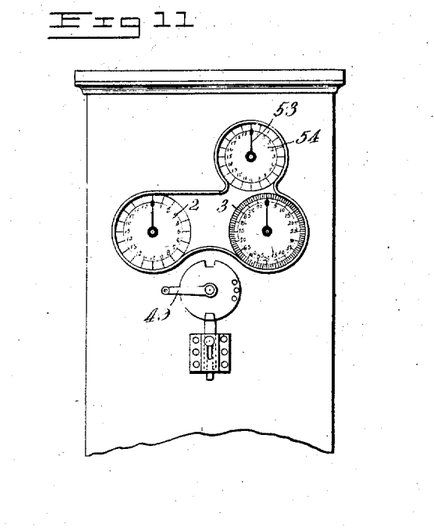
Fig. 11 is a detail front elevation of the construction shown in Fig. 10.

Figs. 10 and 11 illustrate a modification in which the steel tape 17 is secured on a drum 48, which latter is rotated by a crank shaft 49 through a train of gears 50, 51 and 52. A pointer 53 is secured to the shaft of one of said gears to coöperate with a dial face 54 for accurately indicating the extent of rotation given to the drum 48.

Figure 14:
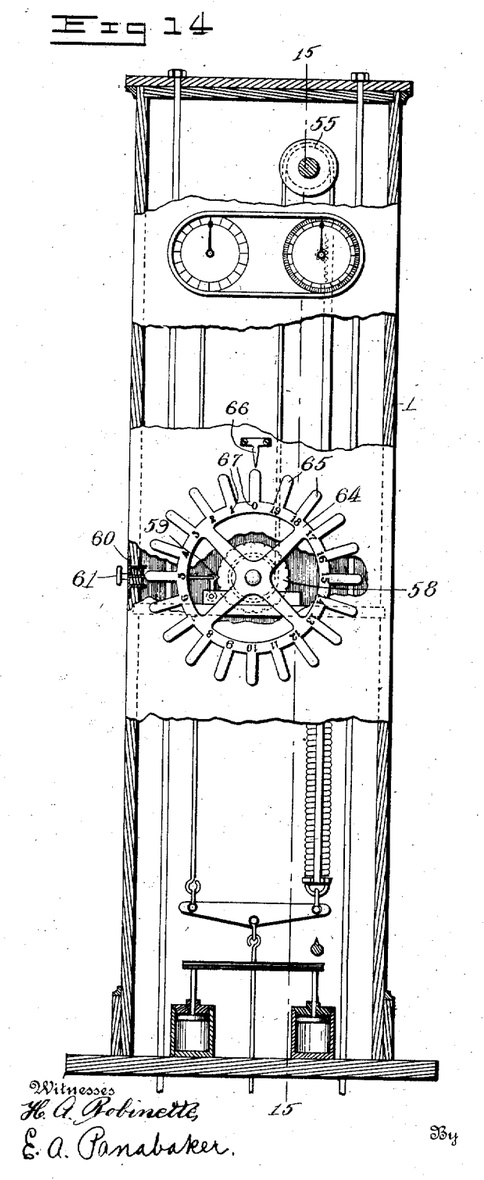
Fig. 14 is a sectional view, with parts shown in front elevation, illustrating a preferred embodiment of my invention.
Figure 15:
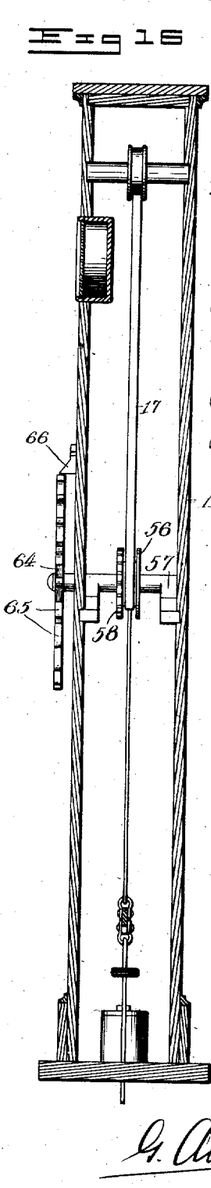
Fig. 15 is a sectional view on the line 15—15 of Fig. 14.

Figs. 14 and 15 illustrate my preferred means for manually adjusting the traveling link 4 for operating the fractional gage pointer. In this modification, the steel tape 17 passes over a guide pulley 55 and is secured to a drum 56 rotatably mounted in bearings 57 carried by the casing 1. A disk 58, secured to said drum, is provided with a series of notches corresponding to the number of divisions on the integer gage 2. A suitable spring dog 59 is normally maintained by a spring 60 in position to engage the notches of the wheel 58, for locking said wheel and its attached drum 56 against rotation; a manually operated handle 61 being conveniently positioned for retracting the dog from engagement with the notched drum.

Figure 16:
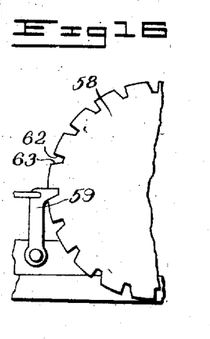
Fig. 16 is a detail elevation, illustrating a satisfactory construction of the notched disk and dog shown in Fig. 14.

Fig. 16 shows a construction adapted to lock the drum 56 against reverse rotation, while permitting free forward rotation of said drum for winding up thereon the steel tape 17. In this construction the notches in the disk 58 are formed with substantially radially extending forward faces 62 and with inclined rear faces 63; the engaging faces of the dog being similarly formed. A hand wheel 64 is secured to the shaft of the drum 56 exterior to the front face of the casing 1; said hand wheel being provided with a series of peripheral extensions 65 which constitute convenient handles for rotating the wheel and also act as pointers coöperating with an index 66 fixed on the casing 1. The hand wheel 64 is provided with a series of successively-numbered indexes 67, corresponding in angular position and number to the notches in the disk 58.

From the above description, it will be seen that my preferred construction provides a strong and satisfactory means, in convenient position for access by the operator from either side of the scale platform. Further, the relation between the radii of the drum 56 and of the operating handle 65 enables said drum to be readily and easily rotated for extending the spring 14, since the tension on said spring will not exceed approximately 65 pounds when the scale is loaded to its full capacity.

Figure 17:
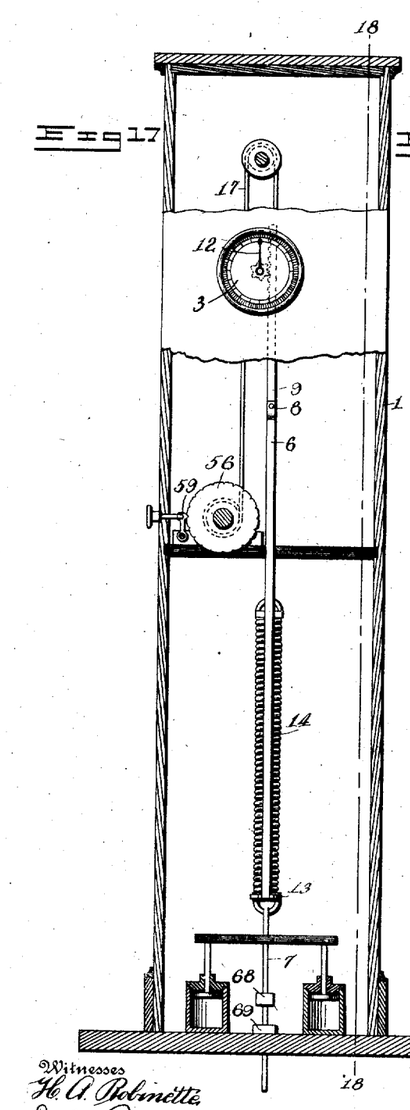
Fig. 17 is a sectional view, with the fractional gage shown in front elevation, illustrating a modified construction.
Figure 18:
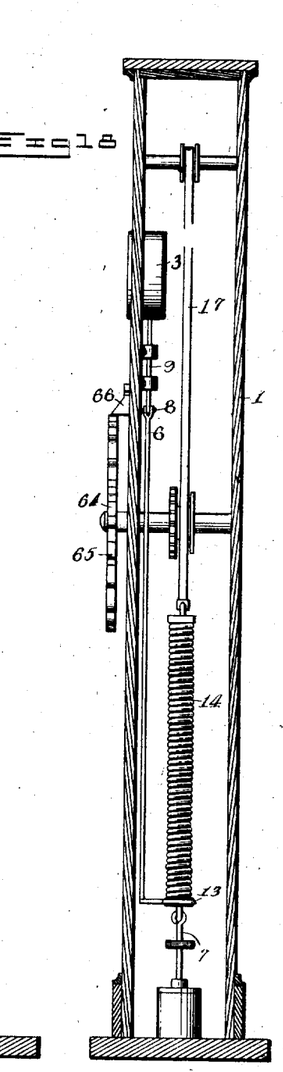
Fig. 18 is a sectional view on the line 18—18, of Fig. 17.

Figs. 17 and 18 illustrate a modified construction, in which the integer gage and its connections are entirely dispensed with; the lower head 13 of the spring 14 being pivotally connected directly to the connecting rod 7 leading in the usual way to any well known arrangement of weighing levers. The construction of the fractional gage and of the connections between said dial and the lower head 13 are exactly similar to those described in reference to Figs. 1 and 2, and a further description thereof would be mere repetition. A drum mechanism 56, 58 and hand wheel 64, similar to that described with reference to Figs. 15 and 16, is provided for winding up the steel tape 17 for extending the spring 14. A stop 68 is carried by the connecting rod 7 in position to engage a fixed stop 69 upon depression of said connecting rod during the loading of the scale. The travel of said stop 68, from its normal position in the unloaded condition of the scale to its engagement with the fixed stop 69, is so proportioned that the lower head 13 will be depressed sufficiently to cause one revolution of the fractional gage pointer 12 when said stop 68 is depressed into engagement with the fixed stop 69; further the normal distance between the stops 68 and 69, in the unloaded condition of the scale, is exactly equal to the length of the steel tape 17, which is wound on the drum 56 during the rotation of said drum through the angle subtended by any two adjacent notches on the wheel 58 secured to said drum. In describing the operation of this modified construction, it will be assumed, for the sake of clearness, that a load of 100 pounds on the scale platform will depress the stop 68 to engagement with the fixed stop 69, and thereby cause one revolution of the pointer 12 of the fractional gage 3; any loading of the platform scale in excess of 100 pounds acting merely to increase the pressure of the stop 68 against the fixed stop 69. Thus, when any load in excess of 100 pounds has been placed on the platform scale, the fractional-gage pointer will be shifted around one revolution and there remain stationary. The operator will then turn the hand wheel 64 until the gage pointer begins to move in a reverse direction, and will then cease such movement of the hand wheel when the next succeeding notch thereafter in the disk 58 has been brought into engagement with the spring dog 59. This operation of the hand wheel 64 will cause the gage pointer 12 to indicate the fractional portion of the load, in a manner similar to that previously described in the operation of the construction shown in Figs. 1–5. The integer portions of the load will be read directly from that one of the series 67 of index numbers on the hand wheel which has been brought into registry with the fixed index 66 by such operation of said hand wheel. As a specific example, with a load of 260 pounds on the scale platform, it will be found that the rotation of the hand wheel 64 to produce a reverse movement of the gage pointer 12 will bring the index number 2 on said hand wheel in register with the fixed index 66; and that the gage pointer 12 will be carried by its reverse rotation to the division on its dial indicating 60 pounds. It will be obvious that where the scale platform is loaded to an extent less than 100 pounds, the weight of said load will be indicated directly on the fractional dial; there being no necessity for actuation of the hand wheel 64 by the operator.

I have illustrated and described preferred and satisfactory constructions, but, obviously, changes could be made within the spirit and scope of my invention.

Having thus described my invention, what I claim and desire to secure by Letters Patent is:

1. In a scale, the combination of independent gages, actuating means for operating certain of said gages during loading of the scale throughout its full capacity, shifting means for adjusting said actuating means to operate the other of said gages, and manually operated means for actuating said shifting means at any load within the capacity of the scale, substantially as described.

2. In a scale, the combination of independent gages, actuating means for operating certain of said gages during loading of the scale throughout its full capacity, shifting means for adjusting said actuating means to operate the other of said gages, manually operated means for actuating said shifting means at any load within the capacity of the scale, and means for indicating the extent of movement of said shifting means, substantially as described.

3. In a scale, the combination of a traveling link, a pair of gages, connections between said traveling link and gages, means for converting said link into a lever at a predetermined loading of the scale, and shifting means for re-converting said link from a lever to a traveling link, substantially as described.

4. In a scale, the combination of a traveling link, a connecting rod for actuating said link, a pair of gages, connections between said traveling link and gages, means for converting said link into a lever at a predetermined loading of the scale, and shifting means for adjusting said link to re-convert it from a lever to a traveling link, substantially as described.

5. In a scale, the combination of a traveling link, a pair of gages, connections between said traveling link and gages, means for converting said link into a lever at a predetermined loading of the scale, shifting means for re-converting said link from a lever to a traveling link, and manually operated means for actuating said shifting means at any load within the capacity of the scale, substantially as described.

6. In a scale, the combination of a traveling link, a pair of gages, connections between said traveling link and gages, means for converting said link into a lever at a predetermined loading of the scale, shifting means for re-converting said link from a lever to a traveling link, and deadening devices carried by said traveling link for preventing oscillations of said gages, substantially as described.

7. In a scale, the combination of a traveling link, a pair of gages, connections between said traveling link and gages, means for converting said link into a lever at a predetermined loading of the scale, shifting means for re-converting said link from a lever to a traveling link, and means for indicating the extent of movement of said shifting means, substantially as described.

8. In a scale, the combination of an integer gage provided with divisions indicating units, a fractional gage indexed to indicate fractional parts of said units, means for actuating both of said gages during the initial loading of the scale to the extent of one of the units of said integer gage, means for automatically locking said fractional gage from action during further loading of the scale, and manually operated means for causing a reverse actuation of said fractional gage to indicate fractional unit parts of the scale loading, substantially as described.

9. In a scale, the combination of an integer gage provided with divisions indicating units, a fractional gage indexed to indicate fractional parts of said units, means for actuating both of said gages during the initial loading of the scale to the extent of one of the units of said integer gage, means for automatically locking said fractional gage from action during further loading of the scale, manually operated means for causing a reverse actuation of said fractional gage to indicate fractional unit parts of the scale loading, and means for indicating the extent of movement of said manually operated means, substantially as described.

10. In a scale, the combination of an integer gage provided with divisions indicating units, a fractional gage indexed to indicate fractional parts of said units, a traveling link, a rod connecting said link and integer gage, means connected to said link for actuating said fractional gage, a stop in the path of said traveling link for engaging said link to lock the actuating means of said fractional gage against operation while permitting uniform actuation of said integer gage, and manual-operated means connected to said traveling link for producing a reverse action of said fractional gage to indicate the fractional unit parts of the scale loading, substantially as described.

11. In a scale, the combination of a traveling link, a pair of gages, connections between said traveling link and gages, means for converting said link into a lever at a predetermined loading of the scale, a resilient connection to said traveling link, and shifting means for adjusting said resilient connection, to reconvert said link from a lever to a traveling link, substantially as described.

12. In a scale, the combination of an integer gage provided with divisions indicating units, a fractional gage indexed to indicate fractional parts of said units, a common actuating means for said gages, manually-operated means for adjusting said fractional gage to indicate fractional unit parts of any scale loading within the capacity of said scale, and a series of indexes corresponding to the divisions of said integer scale for determining the extent of operation of said manually-operated means, substantially as described.

13. In a scale, the combination of an integer gage provided with divisions indicating units, a fractional gage indexed to indicate fractional parts of said units, a common actuating means for said gages, means for locking the fractional gage from actuating during loading of the scale in excess of said gage's capacity, manually-operated means for adjusting said fractional gage to indicate fractional unit parts of the scale loading, and a series of indexes corresponding to the divisions of said integer scale for determining the extent of operation of said manually-operated means, substantially as described.

14. In a scale, the combination of an integer gage provided with divisions indicating units, a fractional gage indexed to indicate fractional parts of said units, a common actuating means for said gages, means for locking the fractional gage from actuation during loading of the scale in excess of said gage's capacity, manually-operated means for adjusting said fractional gage to indicate fractional unit parts of the scale loading, and a series of indexes on said manually-operated means corresponding to the divisions of said integer scale, substantially as described.

15. In a scale, the combination of independent gages, a common actuating means for operating certain of said gages during loading of the scale throughout its full capacity, a resilient connection to said common actuating means, and manually-operated means for actuating said resilient connection to operate the other of said gages, substantially as described.

16. In a scale, the combination of an integer gage provided with divisions indicating units, a fractional gage indexed to indicate fractional parts of said units, a common actuating means for said gages, means for locking said fractional gage from actuation during loading of said scale in excess of said gage's capacity, a resilient connection to said common actuating means, and manually-operated means for actuating said resilient connection to shift said common actuating means for adjusting said fractional gage to indicate fractional unit parts of the scale loading, substantially as described.

17. In a scale, the combination of a fractional gage having a capacity less than that of the scale, connections between said scale and gage for actuating the latter during loading of the scale throughout the capacity of said gage, and manually-operated means for adjusting said fractional gage to indicate fractional parts of any scale loading within the capacity of said scale, substantially as described.

18. In a scale, the combination of a gage, having a capacity less than that of the scale, connections between said scale and gage for actuating the latter during initial loading of the scale, and manually-operated means for indicating the proportion of the load corresponding to integer multiples of the capacity of said gage, substantially as described.

19. In a scale, the combination of a gage having a capacity less than that of the scale, connections between said scale and gage for actuating the latter during initial loading of the scale throughout the capacity of said gage, means for automatically locking the gage against actuating during loading of the scale in excess of said gage's capacity, and manually-operated means for indicating the proportion of the load corresponding to integer multiples of the capacity of said gage, substantially as described.

20. In a scale, the combination of a gage having a capacity less than that of the scale, connections between said scale and gage for actuating the latter during initial loading of the scale throughout the capacity of said gage, means for automatically locking the gage against actuating during loading of the scale in excess of said gage's capacity, and manually-operated means for indicating the proportion of the load corresponding to integer multiples of the capacity of said gage and for actuating said gage to indicate the proportion of the load corresponding to a weight less than the capacity of said gage, substantially as described.

In testimony whereof I affix my signature in presence of two witnesses.

HORATIO BONAR OSGOOD.

Witnesses:
   ARCHIBALD HOWARD,
   DANA B. HINMAN.